United States Patent

[19]

Mashimo et al.

[11] Patent Number: 5,991,835
[45] Date of Patent: Nov. 23, 1999

[54] PERIPHERAL DATA STORAGE DEVICE IN WHICH TIME INTERVAL USED FOR DATA TRANSFER FROM RELATIVELY FAST BUFFER MEMORY TO RELATIVELY SLOWER MAIN MEMORY IS SELECTED IN VIEW OF AVERAGE OF TIME INTERVALS DURING WHICH DATA BLOCKS WERE RECENTLY RECEIVED FROM HOST

[75] Inventors: Akira Mashimo, Tokorozawa; Seiichi Ohnuki, Fuchu; Gui Changhao, Iruma; Hidehiko Murata, Niiza; Kohji Yamana, Iruma, all of Japan

[73] Assignee: TEAC Corporation, Tokyo, Japan

[21] Appl. No.: 08/560,814

[22] Filed: Nov. 20, 1995

[30] Foreign Application Priority Data

Nov. 22, 1994 [JP] Japan .................................. 6-312685
Dec. 12, 1994 [JP] Japan .................................. 6-332093

[51] Int. Cl.$^6$ ............................. G06F 13/14; G06F 13/38
[52] U.S. Cl. .................................. 710/58; 710/60; 710/61; 711/111; 711/113; 711/118
[58] Field of Search .................................. 395/250, 440, 395/200.13, 494, 558, 873, 876, 877, 878, 879, 880, 881, 872; 360/60, 84; 711/113, 135, 143, 167; 710/58, 60, 61

[56] References Cited

U.S. PATENT DOCUMENTS

| | | | |
|---|---|---|---|
| 4,344,132 | 8/1982 | Dixon et al. .............................. | 395/880 |
| 4,463,443 | 7/1984 | Frankel et al. ........................... | 395/880 |
| 4,476,526 | 10/1984 | Dodd ....................................... | 395/440 |
| 4,811,203 | 3/1989 | Hamstra .................................. | 711/142 |
| 4,860,193 | 8/1989 | Bentley et al. .......................... | 395/250 |
| 4,960,030 | 10/1990 | Fujimori .................................. | 84/609 |
| 4,985,784 | 1/1991 | Tsuboi et al. ........................... | 386/109 |
| 5,016,165 | 5/1991 | Tanikawa et al. ....................... | 395/842 |
| 5,193,172 | 3/1993 | Arai et al. ............................... | 395/674 |
| 5,249,271 | 9/1993 | Hopkinson et al. ..................... | 395/877 |
| 5,347,635 | 9/1994 | Voeten et al. ........................... | 395/880 |
| 5,408,678 | 4/1995 | Kato et al. .............................. | 395/880 |
| 5,412,780 | 5/1995 | Rushton .................................. | 711/113 |
| 5,414,816 | 5/1995 | Oyadomari .............................. | 395/880 |
| 5,426,736 | 6/1995 | Guineau, III ........................... | 395/250 |
| 5,450,548 | 9/1995 | Matsushima ............................ | 395/881 |
| 5,513,326 | 4/1996 | Nute ....................................... | 395/880 |
| 5,537,566 | 7/1996 | Konno et al. ........................... | 395/441 |
| 5,539,915 | 7/1996 | Burton et al. ........................... | 395/841 |
| 5,548,740 | 8/1996 | Kiyohara ................................ | 395/427 |
| 5,623,607 | 4/1997 | Kodama et al. ........................ | 395/250 |
| 5,623,631 | 4/1997 | Tsuboi et al. ........................... | 711/143 |
| 5,625,615 | 4/1997 | Dente et al. ............................ | 369/116 |
| 5,631,888 | 5/1997 | Itoh et al. ............................... | 369/60 |
| 5,649,217 | 7/1997 | Yamanaka et al. ..................... | 395/872 |

*Primary Examiner*—Eddie P. Chan
*Assistant Examiner*—Hong Kim
*Attorney, Agent, or Firm*—Woodcock Washburn Kurtz Mackiewicz & Norris LLP

[57] ABSTRACT

A rotating disk data storage device having a buffer in the form of a semiconductor memory for temporarily storing data supplied from a host computer prior to transfer to a disk drive. For most efficient data transfer from buffer to disk, the storage device has a microprocessor controller which is preprogrammed to compute the average, or weighted average, of the time intervals at which at least three, preferably eight, latest consecutive data blocks are delivered from the host, the average being updated with the reception of each new data block from the host. The data is transferred from buffer to disk at time intervals each determined by multiplying the latest average time interval by a preselected coefficient. Data transfer from buffer to disk also occurs when the time interval between any two consecutive data blocks exceeds a predetermined limit, or when the amount of data stored in the temporary memory exceeds a predetermined limit.

22 Claims, 11 Drawing Sheets

PERIPHERAL DATA STORAGE DEVICE IN WHICH TIME INTERVAL USED FOR DATA TRANSFER FROM RELATIVELY FAST BUFFER MEMORY TO RELATIVELY SLOWER MAIN MEMORY IS SELECTED IN VIEW OF AVERAGE OF TIME INTERVALS DURING WHICH DATA BLOCKS WERE RECENTLY RECEIVED FROM HOST

BACKGROUND OF THE INVENTION

This invention relates generally to peripheral devices for storing data delivered from a host computer, such data storage devices typically including hard magnetic disk drives and magneto-optic disk drives. More specifically, the invention deals with such rotating disk data storage devices incorporating a temporary memory known as a buffer in order to compensate for the rather low accessibility of the hard disk drive or like main storage. Still more specifically, the invention pertains to an improved method of, and means for, storing data in disk drives or the like with the aid of buffering.

Disk drives have won widespread commercial acceptance as peripheral data storages of computer systems. Their accessibility, however, is unsatisfactory compared with that of semiconductor memories, because in disk drives the transducer must travel across a multiplicity of annular, concentric tracks on the disk surface for accessing the individual tracks for writing or reading.

A well known remedy to this difficulty is buffering, with a buffer or a cache in the form of a semiconductor memory built into a disk drive, as taught for example in U.S. Pat. No. 4,476,526. Delivered to the disk drive from the host computer, data is first directed into the buffer memory. Upon completion of data storage in the buffer the disk drive informs the host to that effect, regardless of whether the data has then been already redirected from the buffer to the disk or not. The disk drive is thus virtually made shorter in access time, demanding less time for storing the data fed from the host.

However, the buffering of disk drives does not necessarily result in the improvement of accessibility if the data is redirected from buffer to disk immediately after being stored in the former. Suppose for instance that one data block is now being read out from the buffer and written on the disk. If then the host supplies another data block, the buffer is not in condition for accepting it. The access time of the disk drive is not shortened in this and similar cases.

The following two methods have been suggested and used in order to defeat this weakness of buffering:

1. To transfer data from buffer to disk at regular time intervals (e.g. 30 seconds).
2. To transfer data from buffer to disk only when the buffer fills up.

The first described method is objectionable because data is rewritten on the disk at time intervals totally independent of those at which the host demands access to the disk drive. Since the access time intervals of the host are random, the accessibility of the disk drive is not necessarily improved in this manner. The second method is also undesirable in that data, not yet recorded on the disk, may be left stored in the buffer for indefinitely long periods of time. Such data is susceptible to destruction in the event of a power outage or a mistake in operation or handling.

SUMMARY OF THE INVENTION

The present invention seeks to improve the accessibility of peripheral data storage devices of the type having a temporary memory in addition to a main memory such as a disk drive, in the face of variable time intervals at which the host may demand access to the storage device.

Briefly stated in one aspect thereof, the present invention provides a data storage method suitable for implementation in a peripheral data storage device wherein data blocks received at variable time intervals from a host computer are stored in a temporary memory prior to transfer to a main memory, the temporary memory being shorter in access time than the main memory. The method dictates the measurement of the time intervals at which successive data blocks are received from the host and stored in the temporary memory. The time intervals of at least three latest consecutive data blocks are then averaged. The successive averages thus obtained are then multiplied by a preselected coefficient thereby determining time intervals at which data is to be transferred from the temporary memory to the main memory.

Thus, according to the present invention, data is transferred from the temporary memory (buffer) to the main memory (disk) not at fixed time intervals or when the temporary memory fills up, as has been the case heretofore, but at time intervals that are subject to change with the averages of the variable time intervals of data block delivery from the host. The average of the time intervals of three or more latest consecutive data blocks is necessarily updated as each new data block is received from the host. Each such updated average is multiplied by a preset coefficient to determine the next time interval of data transfer from buffer to disk.

Assume, for a better understanding of the advantages of the present invention, that the host supplies data blocks of approximately the same size. Then the amount of data directed into the buffer in a certain length of time will be greater when the host supplies data blocks at relatively short time intervals than when they are supplied at longer time intervals. However, a correspondingly greater amount of data will be transferred from buffer to disk during the same length of time because such data transfer will take place at correspondingly shorter time intervals. The storage capacity of the buffer is thus made utmost use of by making as little as possible the changes in the amount of data transferred each time from buffer to disk. The accessibility of the data storage device, comprising the disk drive and the buffer, is greatly improved in the face of variable time intervals at which data blocks are supplied from the host.

In the practice of the data storage method summarized above, data may be transferred from buffer to disk immediately when the time interval between any two consecutive data blocks from the host exceeds a predetermined limit, without regard to the above explained time intervals of data transfer from buffer to disk. This is because data might be otherwise left stored in the buffer for a prolonged period of time pending the inputting of the next data block.

Also, in practice, the amount of data stored in the temporary memory cam be constantly supervised. Data may be transferred from buffer to disk immediately when the buffer fills up, without regard to the noted time intervals of data transfer from buffer to disk.

Preferably, the weighted average, instead of the simple average set forth above, of the time intervals of at least three latest consecutive data blocks may be computed. The weighted average may then be multiplied by a preset coefficient to determine the time interval of data transfer from buffer to disk. The weighted average should be calculated by giving progressively greater weights to more recent data block time intervals. The resulting time interval of data transfer from buffer to disk is therefore determined with increasingly greater emphasis on more recent data block time intervals.

Stated in another aspect thereof, the present invention provides a data storage method such that it is determined, upon averaging of the time intervals of at least three latest consecutive data blocks, whether the whole data stored then in the buffer is transferable therefrom to the disk in the latest average data block interval. If such data transfer is found possible, the whole stored data is immediately transferred from buffer to disk. If it is found impossible, on the other hand, then data is transferred from buffer to disk when the data stored in the buffer subsequently increases to a predetermined limit.

The average data block time interval computed according to the alternate method summarized above is essentially equivalent to the expected most likely time interval between the latest data block and the next. The whole data stored in the buffer at that time is transferred to the disk if such data transfer is found possible within this expected most likely time interval. The expected time interval may be more reasonably determined by computing the weighted average of some latest consecutive data block time intervals, as set forth previously.

Preferably, data may be additionally transferred from buffer to disk both when the buffer fills up and upon lapse of a preset length of time from the preceding data transfer from buffer to disk. Data is therefore left stored in the buffer for much shorter lengths of time than if, as has been practiced heretofore, data is transferred from buffer to disk only at regular time intervals or when the buffer fills up. Such shorter data stay in the buffer is desirable from the standpoint of data safety. As an additional advantage, being frequently emptied, the buffer is as often ready to accept large amounts of data from the host, contributing to the shorter apparent access time of the disk drive.

Possibly, in the practice of the alternate method according to the present invention, data may be transferred from buffer to disk each time a data block is input from the host. Such data transfer occurs, however, only when it has been confirmed that the data stored then in the buffer is very likely to be wholly transferred to the disk before the host supplies the next data block. Such regular data transfer should therefore be construed merely as one possible state, lasting only limited lengths of time, that is naturally encountered in the practice of the inventive method.

For a still shorter access time the above summarized alternate method may be modified with regard to the case in which the transfer of all the stored data from buffer to disk has proved impossible in the latest average data block time interval. Then a desired time interval at which data is to be transferred from the temporary memory to the main memory may be determined by multiplying the latest average data block time interval by a preselected coefficient. Data may then be transferred from buffer to disk upon lapse of the desired time interval from previous such data transfer.

Data transfer from buffer to disk takes place on two major occasions in this modified method: (a) when the transfer of the whole stored data from buffer to disk is found possible in the latest average data block time interval; and (b) when the desired time interval, determined by multiplying the latest average data block time interval by a preset coefficient, expires after previous data transfer. It should be noted that the latest average data block time interval is made utmost use of in both cases, realizing a drastic improvement in the accessibility of the data storage device.

All the foregoing methods are well calculated for execution by means of programmable microprocessor controllers which can be readily built into rotating disk data storage devices. The configurations of such controllers will also be disclosed.

The above and other features and advantages of this invention and the manner of realizing them will become more apparent, and the invention itself will best be understood, from a study of the following description and appended claims, with reference had to the attached drawings showing some preferable embodiments of the present invention.

DESCRIPTION OF THE PREFERRED EMBODIMENTS

Figure 1:
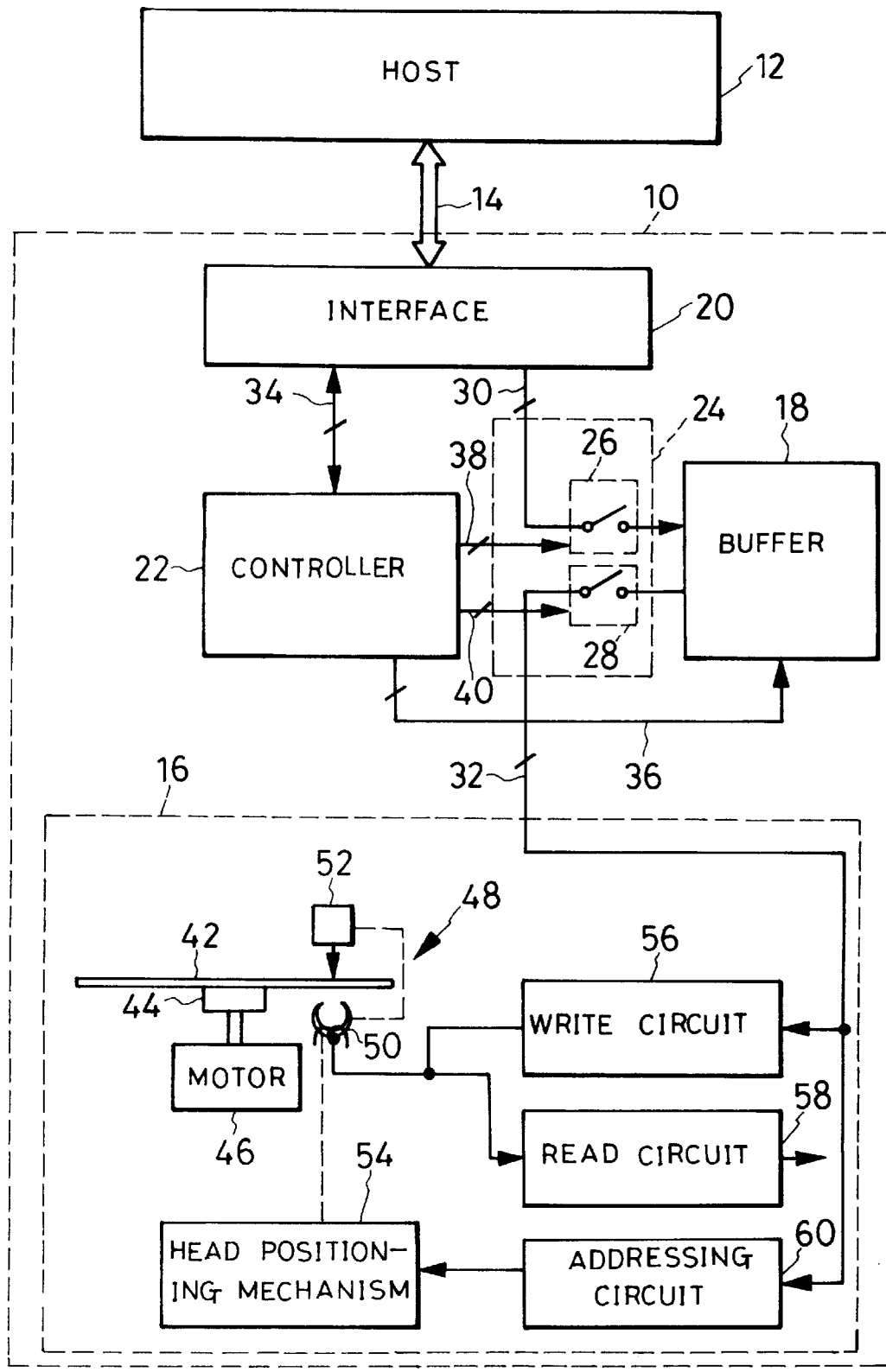
FIG. 1 is a block diagram of the peripheral data storage device having a buffer and a programmable microprocessor controller incorporating the novel concepts of the present invention, the data storage device being shown together with a host computer from which data is supplied for storage.

The principles of the present invention are believed to be best implemented in the peripheral data storage device generally designated 10 in FIG. 1 and therein shown connected to a host computer system 12 via a bus 14. The host 12 delivers data to be stored in the storage device 10, together with various instructions such as addresses and commands, and also accepts data retrieved from the device.

The storage device 10 comprises a magneto-optic disk drive 16 as a main memory and a buffer 18 as a temporary memory, the latter being in the form of a random access semiconductor memory. Additionally, the storage device 10 is shown to comprise an interface 20, a programmable microprocessor controller 22, and buffer input/output control means 24. The interface 20 such as the standard small computer systems interface (SCSI), serves to connect the disk drive 16, as well as one or more other similar disk drives, to the host 12. The buffer input/output control means 24 are shown to comprise two on/off switch means 26 and 28.

The buffer 18 is connected to the interface 20 by way of a data transmission path 30 having the buffer input control switch means 26, and to the disk drive 16 by way of another data path 32 having the buffer output control switch means 28. The controller 22 is connected to the interface 20 by way of a control signal path 34, to the buffer 18 by way of an address signal path 36, and to the switch means 26 and 28 by way of switching signal paths 38 and 40.

Notwithstanding the showing of FIG. 1, the data paths 30 and 32 and the signal paths 34, 36, 38 and 40 are all each constituted of a plurality of lines. The switch means 26 and 28 are also each composed of a plurality of switches, one on each constituent line of the data path 30 or 32. Data from the host 12 is written on the buffer 18 when all the switches 26 are closed by the controller 22, and transferred therefrom to the disk drive 16 when all the switches 28 are closed. The controller 22 is preprogrammed for implementing the novel buffering data storage method according to the present invention, as will be later discussed in detail.

The magneto-optic disk drive 16 is itself of conventional make having a magnetic disk 42 mounted on a turntable 44 to be rotated by an electric drive motor 46. It is understood that, as is conventional in the art, the disk drive motor 46 is connected to a supply circuit, not shown, so as to start rotation when the host computer system 12 is powered on.

For data transfer with the rotating disk 42 there is provided a head assembly 48 comprising a magnetic transducer 50 and a light beam projector such as a laser 52. Magnetic and optical recording techniques are thus combined in a known manner to achieve recording densities much higher than are achieved by magnetic recording. A head positioning mechanism 54 is coupled to the head assembly 48 for moving the 8 same across a set of concentric data tracks on the disk 42. Because of such physical travel of the head assembly 48, required for accessing the individual tracks on the disk 42, the access time of the disk drive 16 is inevitably far longer than that of the buffer 18, the latter being in the form of a semiconductor memory.

The disk drive 16 additionally comprises a write circuit 56 connected between the buffer output control switch means 28 and the head assembly 48 for processing input data into form suitable for writing on the disk 42 by the head assembly. A read circuit 58 is connected to the head assembly 48 for processing the data that has been retrieved from the disk. The showing of no further details of read circuitry is considered necessary because of their impertinence to the present invention. An addressing circuit 60 between the buffer output control switch means 28 and the head positioning mechanism 54 for translating the logic addresses fed from the buffer 18 into physical ones.

Controller Configuration

Figure 2:
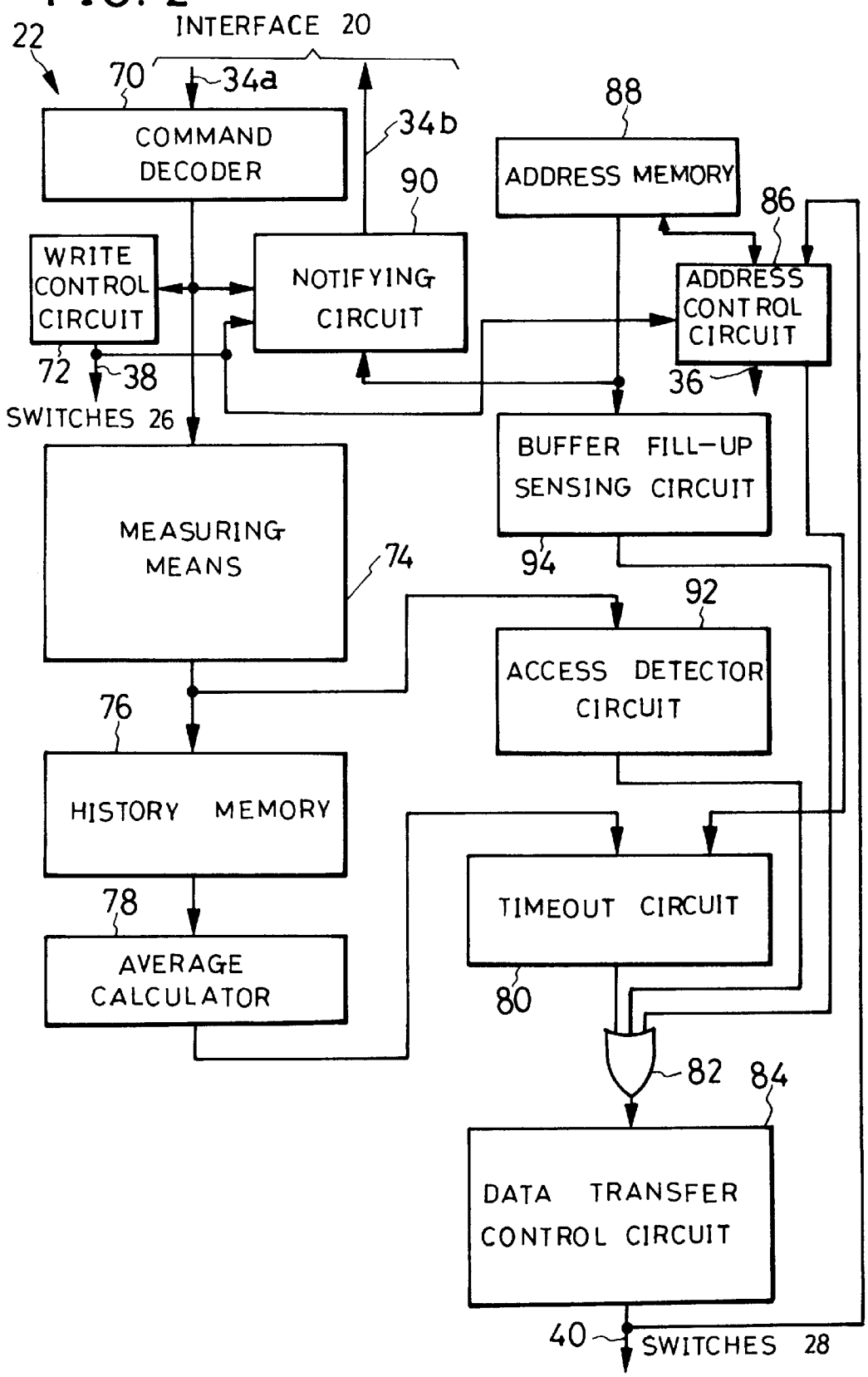
FIG. 2 is an equivalent block diagram of the controller of the FIG. 1 device.

Functionally speaking, and as far as the present invention is concerned, the programmable microprocessor controller 22 of the data storage device 10 may be thought of as being constructed as diagramed in FIG. 2. The controller includes, first of all, a command decoder 70 connected to the interface 20 by way of a path 34a for decoding access commands, particularly write commands, supplied from the host 12 for accessing the storage device 10 or disk drive 16.

Connected to the command decoder 70, a write control circuit 72 produces a write control signal in response to each decoded write command. The write control signal is delivered over the path 38 to the buffer input control switch means 26 for closing the same, whereupon the data accompanying the write command, complete with address information, is directed from interface 20 to buffer 18 over the path 30.

Also connected to the command decoder 70 is a means 74, provided according to the novel concepts of the present invention, for measuring the time intervals at which successive data blocks are received from the host 12. More specifically, for the measurement of the data block time intervals, the means 74 may measure the time intervals between the rises of successive write access commands accompanying the data blocks, as will be detailed subsequently.

A history memory or shift register 76 is connected to the measuring means 74 for storing a preselected number of latest consecutive data block time intervals that have been measured by the means 74. The preselected number should be at least three, being eight in this particular embodiment. The contents of the history memory 76 are updated with each new measurement received from the means 74, the oldest measurement being struck out.

An average calculator 78 is connected to the history memory 76 for averaging the eight latest block time interval measurements stored on that memory. The average computed by this circuit 78 is subject to change each time a new measurement is input to the history memory 78, since the host 12 will supply data blocks at varying time intervals.

Connected to the average calculator 78 is a timeout circuit 80 which determines a desired time interval during which data transfer is to be inhibited from the buffer 18 to the disk 42, by multiplying the average of the eight latest data block time intervals by a prescribed coefficient. Normally, the coefficient is in the range of one to ten, and 1.2 in this particular embodiment. Constantly monitoring the lapse of time from the end of previous data transfer from buffer to disk, the timeout circuit 80 puts out a timeout signal upon expiry of the desired inhibit time interval.

The timeout circuit 80 has its output connected to one of the three inputs of an OR gate 82 and thence to a data transfer control circuit 84. In response to the timeout signal this circuit 84 closes the output control switch means 28, FIG. 1, thereby causing data transfer from buffer to disk.

The output of the data transfer control circuit 84 is also connected to an address control circuit 86 which, connected to the buffer 18 by way of the signal path 20 as in FIG. 1 functions to indicate the addresses of the buffer for writing and reading. An address memory 88 is connected to the address control circuit 86 for storing the first and the last addresses of those storage locations of the buffer 18 where data is written. A notifying circuit 90 is connected to all of the command decoder 70, write control circuit 72 and address memory 88 for notifying the host of the completion of data storage in the buffer 18, rather than on the disk 42. A signal path 34b is used for such notification.

The noted data block time interval measuring means 74 is connected not only to the history memory 76 but also to an access detector circuit 92 and thence to a second input of the three inputs OR gate 82. The access detector circuit 92 determines whether an access command is received from the host 12 within a preset time interval which is several, normally from two to 50 and preferably five, times an average access command time interval. The access detector circuit 92 produces a timeout signal, thereby causing data transfer from buffer to disk, when no access command is detected during the preset time interval.

A buffer fill-up sensing circuit 94 relies on the buffer addresses stored on the address memory 88 in order to determine if the buffer 18 is full, or nearly full, of data. When the buffer fills up, or nearly does so, the sensing circuit 94 sends a signal to a third input of the OR gate 82 for causing data transfer from buffer to disk.

Figure 3:
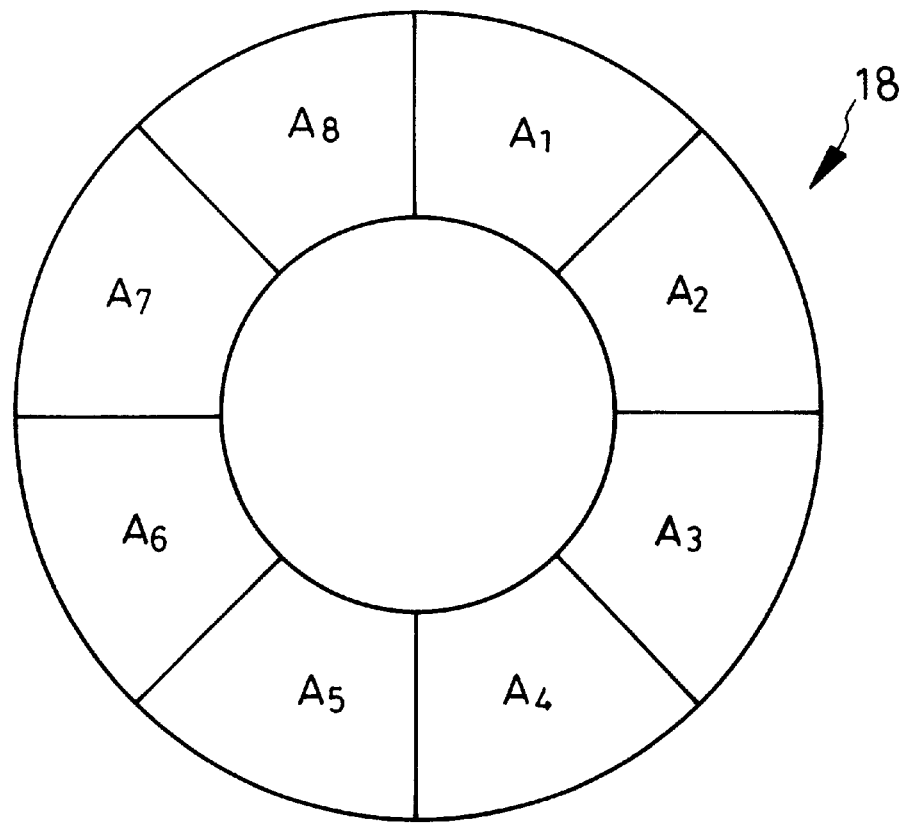
FIG. 3 is a schematic diagram of the buffer included in the FIG. 1 device.
Figure 4:
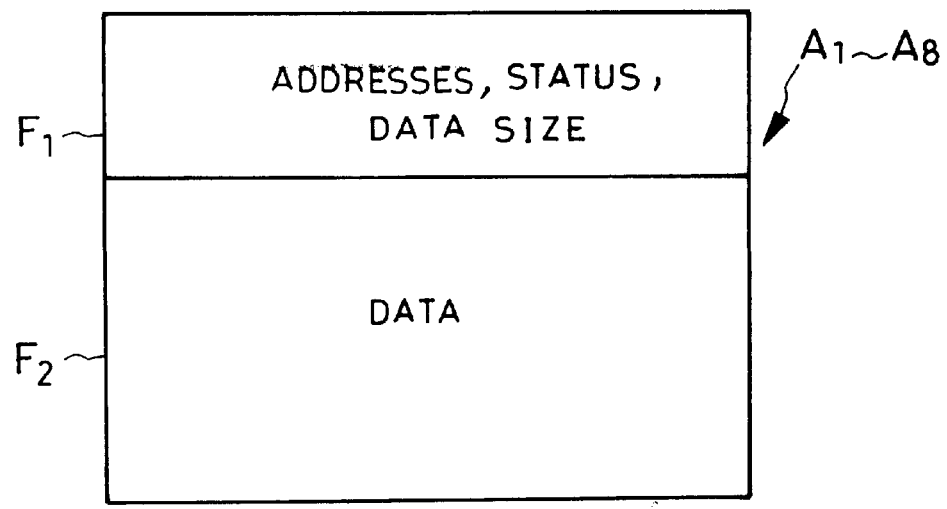
FIG. 4 is explanatory of each of the eight constituent sections of the FIG. 3 buffer.

As diagrammatically depicted in FIG. 3, the buffer 18 may be of the known annular configuration having, for example, eight sections $A_1$–$A_8$ each having a 16 kilobyte storage capacity. Each of these sections has a field $F_1$, FIG. 4, for storing instructions such as addresses, status, and data size, and another field $F_2$ for storing data. Data blocks from the host are written on the buffer 18 in the order of the sections $A_1$, $A_2$, $A_3$ and so forth. The address memory 88 stores the first address of the first buffer section that bears data, and the last address of the last buffer section that bears data.

The buffer 18 is shown in FIG. 1 as being used solely for temporarily storing data to be subsequently written on the disk 42. Alternatively, however, the buffer lends itself to use in both writing and reading. In this case the buffer sections $A_1$–$A_4$ may be used for writing, and the remaining sections $A_5$–$A_8$ for reading, or all the buffer sections may be arbitrarily used for writing and reading as the host demands.

Data Storage Routine

Figure 5:
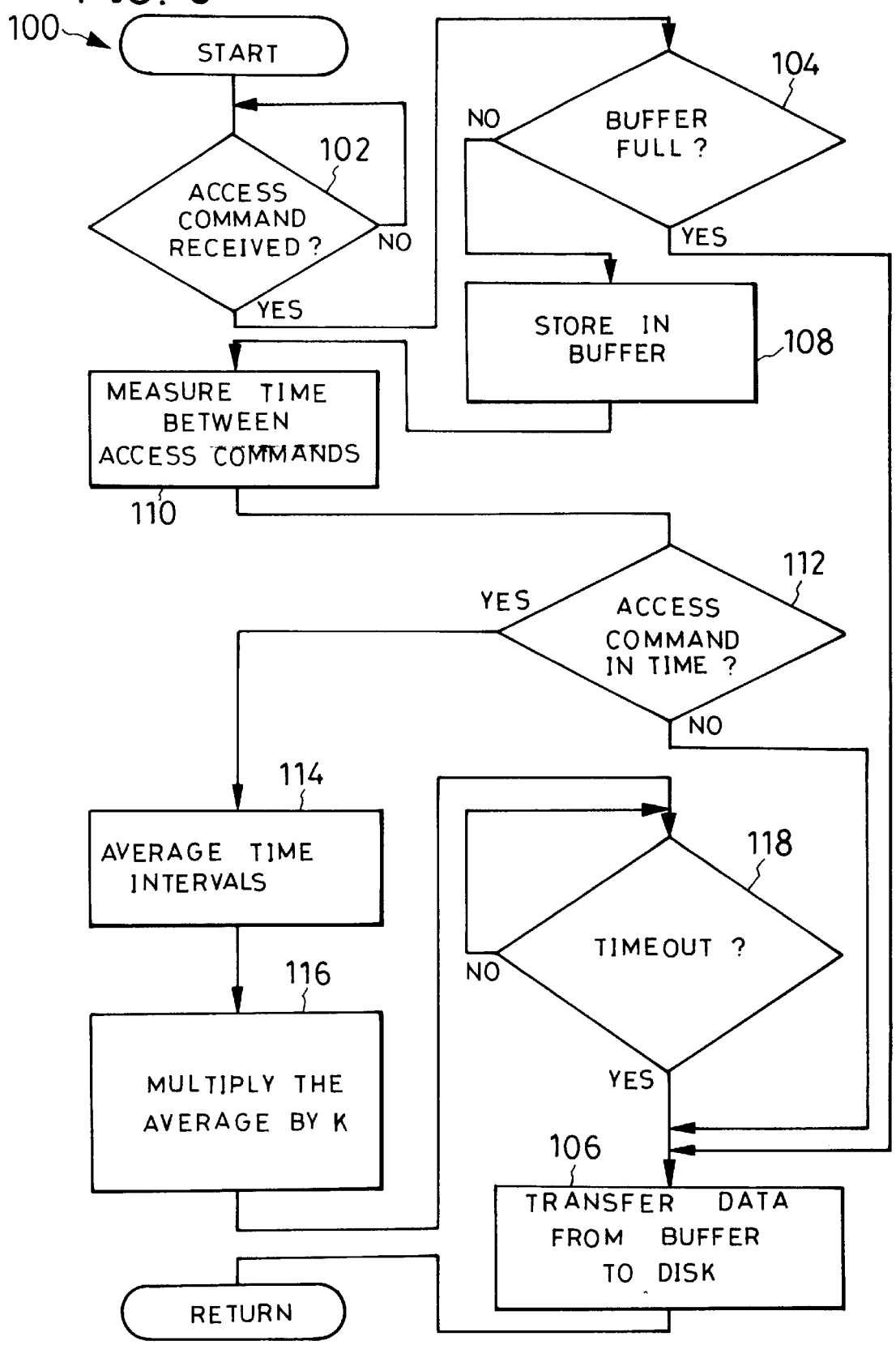
FIG. 5 is a flowchart of a data storage routine to be implemented by the FIG. 2 controller.

Reference is now directed to the flowchart of FIG. 5 for a discussion of a buffering data storage routine 100 introduced into the microprocessor controller 22, FIG. 1, of the data storage device 10 according to the present invention. All the directions and requirements of this routine can be met by the controller 22 configured as set forth above with reference to FIG. 2.

The buffering data storage routine 100 is invoked when a write access command is received at a logical node 102. Then, at the next node 104, it is asked whether the buffer 18 contains a prescribed amount or more of data or, more specifically, whether the buffer is full or nearly so. If the answer is yes, then the routine jumps to a block 106 according to which all the data in the buffer 18 is read out and written on the disk 42. If the buffer is not yet full, on the other hand, then the newly received data is stored in the buffer according to the next block 108.

Then comes another block 110 which dictates the measurement of the time intervals of successive data blocks, or of successive write access commands, received from the host 12. How these time intervals are measured will become apparent from a consideration of FIG. 6. At (A) in this figure are shown data blocks $D_{-8}$–$D_2$ being received from the host for temporary storage in the buffer, and at (B) periods $DT_1$–$DT_7$ of data transfer from buffer to disk. Of the eleven data blocks shown at (A) in FIG. 6 the latest one is designated $D_0$. The data blocks received previously are designated $D_{-1}$, $D_{-2}$, $D_{-3}$, ..., becoming older in that order, and those to be received subsequently are designated $D_1$ and $D_2$, becoming more distant in the future in that order. All such data blocks are each accompanied by a write access command in order to be written on the disk 42. The write access commands are supplied in synchronism with the respective data blocks.

Figure 6:
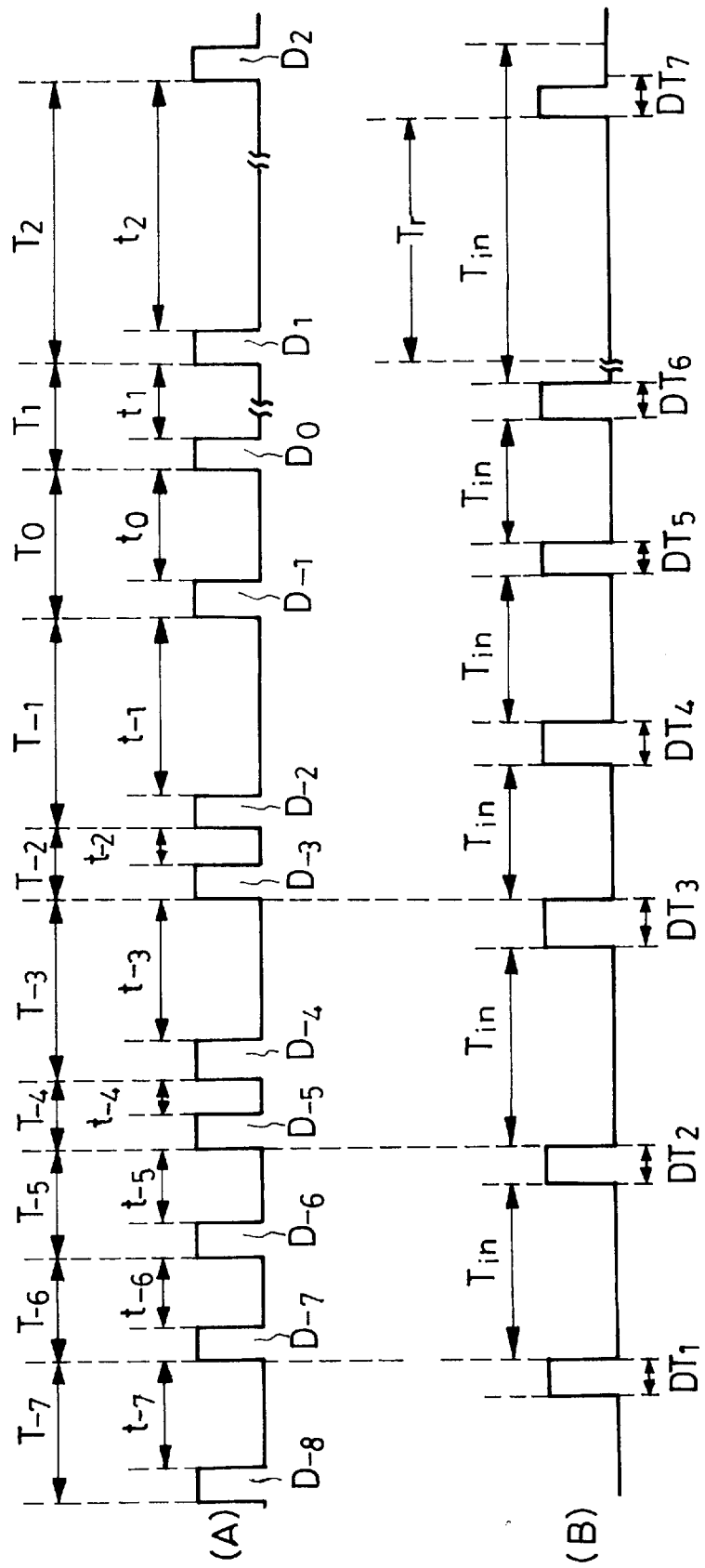
FIG. 6, consisting of (A) and (B), is a timing diagram explanatory of how data blocks are supplied from the host to the buffer, and thence to the disk, according to the FIG. 5 routine.

Thus, for the measurement of the data block time intervals at the block 110 of the FIG. 5 data storage routine 100, there may be measured the time interval from the rise of the preceding write access command to the rise of the current write access command. Such time intervals, designated $T_{-7}$, $T_{-6}$, $T_{-5}$, ... at (A) in FIG. 6, are equivalent to those from the beginning of one data block to the beginning of the next data block. Alternatively, time spacings $t_{-7}$, $t_{-6}$, $t_{-5}$, ... between the data blocks $D_{-8}$, $D_{-7}$, $D_{-6}$, ... may be measured. The time spacings $t_{-7}$, $t_{-6}$, $t_{-5}$, ... of the data blocks are considered equivalent to their time intervals $T_{-7}$, $T_{-6}$, $T_{-5}$, ... for the purposes of the present invention, particularly in view of the fact that the speed of data transfer from host to buffer is far higher than that of data transfer from buffer to disk.

The time intervals of the successive data blocks, or of the successive write access commands, measured as above according to the block 110 of the FIG. 5 data storage routine 100 are stored in the history memory 76, FIG. 2, of the controller 22.

Still another logical node 112 is then encountered which asks whether a write access command has been received within a preset period of time from the preceding such command. This preset waiting period should be significantly longer than the expected average time interval of write access commands, normally from two to fifty, typically five, times the average time interval. In the case where no write access command is received within the waiting period, the routine is redirected to the block 106 for immediate transfer of preexisting data from buffer to disk.

On the contrary, if a new write access command is received within the waiting period, the average of the time intervals of the eight preceding commands and the newly received one is computed according to the next block 114. Suppose for instance that the command accompanying the data block $D_0$, FIG. 6(A), has just been received within the waiting period. Then the average $T_{av}$ of the eight time intervals $T_{-7}$–$T_0$ between the nine consecutive data blocks, including the latest one $D_0$, is computed according to the equation $$T_{av}=(T_0+T_{-1}+T_{-2}+T_{-3}+T_{-4}+T_{-5}+T_{-6}+T_{-7})/8.$$

Similarly, when the next data block $D_1$ is received, the average of the time intervals $T_{-6}$–$T_1$ of the nine latest data blocks, including the block $D_1$, is computed. The average $T_{av}$ is thus updated with each incoming data block and subject to change with possible variations in the time intervals of the successive data blocks.

The average $T_{av}$ computed at the block 114 is then multiplied at the next block 116 by a preselected coefficient K in order to determine a desired period of time $T_{in}$ during which data transfer is to be inhibited from buffer to disk. The coefficient K may range from one to ten and is 1.2 in this particular embodiment. The inhibit period $T_{in}$ is also subject to change with the average $T_{av}$.

Then comes a further logical node 118 at which the lapse of time is monitored from the completion of previous data transfer from buffer to disk. Upon expiry of the inhibit period $T_{in}$ the data is transferred from buffer to disk according to the following block 106. Desirably, all the data that has been stored on the buffer 18 should be transferred to the disk upon lapse of each inhibit period $T_{in}$. In practice, however, the host may restart data delivery during the progress of data transfer from buffer to disk, as at the ends of data transfer periods $DT_1$, $DT_2$ and $DT_3$ in FIG. 6. Then the data transfer from buffer to disk may be suspended for immediate inputting of the new data into the buffer 18. Alternatively, the data transfer periods $DT_1$–$DT_7$ may all be made the same in duration.

Among the advantages gained by the embodiment set forth herein-before with reference to FIGS. 1-6 is the fact that data transfer from buffer to disk takes place not at constant time intervals, as has been the case heretofore, but upon lapse of the variable inhibit period $T_{in}$ proposed according to the present invention. The inhibit period $T_{in}$ depends upon the average $T_{av}$ of the time intervals of a predetermined number of latest consecutive data blocks supplied from the host. Thus, since the inhibit period $T_{in}$ is determined most reasonably according to the time intervals at which the host supplies data blocks, data transfer from buffer to disk will take place most reasonably, too, realizing a drastic curtailment of the accessibility of the rotating disk data storage device.

The normal data storage procedure is overridden, however, in event the buffer fills up, or nearly does so, as at the node 104 in FIG. 5. Then immediate data transfer takes place from buffer to disk for shorter access time.

Another override occurs in event no write access command is received within a preset period of time from the previous command, as set forth at the node 112 in FIG. 5. For instance, in FIG. 6, the access command of the data block $D_2$ is shown to be received upon lapse of a time interval $T_2$ from the access command of the preceding data block $D_1$, and this time interval $T_2$ is shown to be longer than the preset period $T_r$. Then the data that has been stored in the buffer is transferred to the disk upon expiry of the preset period $T_r$, rather than of the inhibit period $T_{in}$. The inhibit period $T_{in}$ in this case would be inconveniently long because of the extended time interval $T_2$ between the data blocks $D_1$ and $D_2$, so that the data transfer from buffer to disk at the end of the shorter preset period $T_r$ is desirable from the standpoint of data safety.

Second Form

Figure 7:
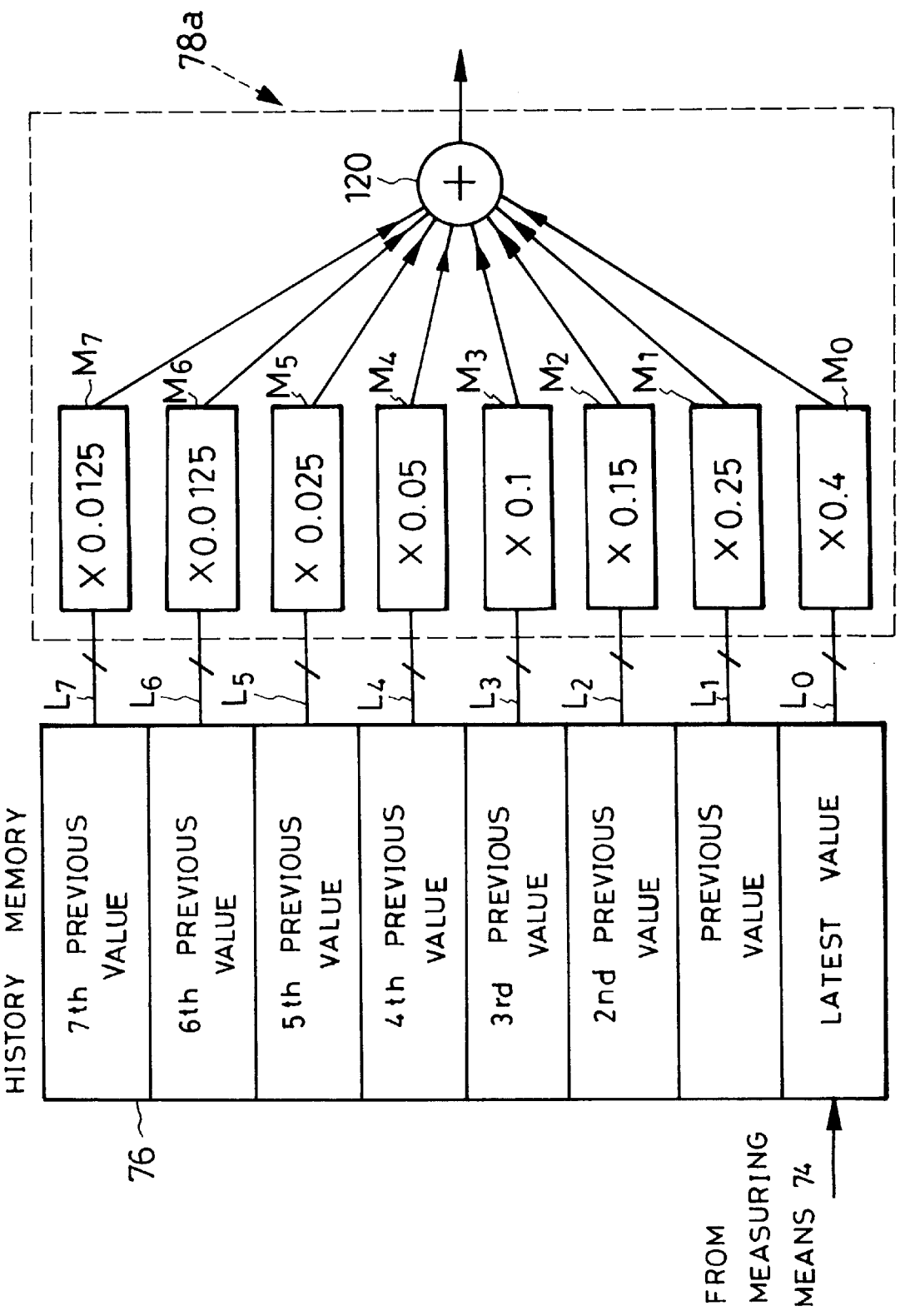
FIG. 7 is a schematic diagram of a weighted average calculator, shown together with the prepositioned shift register, for use in the FIG. 2 controller in substitution for the average calculator.

Another preferred form of data storage device according to the present invention is similar in construction to the showings of FIGS. 1 and 2 except that the average calculator 78, FIG. 2, of the microprocessor controller 22 is replaced by a weighted average calculator shown at 78a in FIG. 7. This figure illustrates the weighted average calculator 78a together with the preceding history memory 76 in the form of an eight stage shift register. As has been set forth, the history memory 76 stores the latest eight consecutive time intervals between the input write access commands, or data blocks, from the measuring means 74. The eight data block time intervals are delivered in parallel to the weighted average calculator 78a over respective lines $L_0$–$L_7$.

The weighted average calculator 78a is shown to comprise eight weight multipliers $M_0$–$M_7$ having their inputs connected to the respective lines $L_0$–$L_7$, and an adder 120 for summing the outputs from the weight multipliers. The calculator 78a computes the weighted average of the input values according to the equation:

$$T'_{av} = w_1 T_0 + w_2 T_{-1} + w_3 T_{-2} + w_4 T_{-3} + w_5 T_{-4} + w_6 T_{-5} + w_7 T_{-6} + w_8 T_{-7}$$

where $T'_{av}$ = weighted average $w_1 - w_8$ = weights $T_0 - T_{-7}$ = data block time intervals.

The weights $w_1$–$w_8$ should grow less in magnitude in that order, that is, from the weight $w_1$ for the latest interval $T_0$ toward the weight $w_8$ for the oldest interval $T_{-7}$. Typically, $w_1$=0.4000

$w_2$=0.2500

$w_3$=0.1500

$w_4$=0.1000

$w_5$=0.0500

$w_6$=0.0250

$w_7$=0.0125

$w_8$=0.0125.

The average $T_{av}'$ of m measurements $T_1, T_2, \ldots, T_m$ having weights $w_1, w_2, \ldots, w_m$ is expressed as $$T'_{av} = \sum_{i=1}^{m} w_i T_i \bigg/ \sum_{i=1}^{m} w_i$$

where $w_i$=weights $w_1, w_2, \ldots, w_m$ $T_i$=m measurements $T_1, T_2, \ldots, T_m$.

The weighting of the data block time intervals makes it possible to determine the average $T_{av}'$, and hence the data transfer inhibit period $T_{in}$, with emphasis made progressively greater from the oldest measurement $T_{-7}$ toward the latest measurement $T_0$.

Third Form

Figure 8:
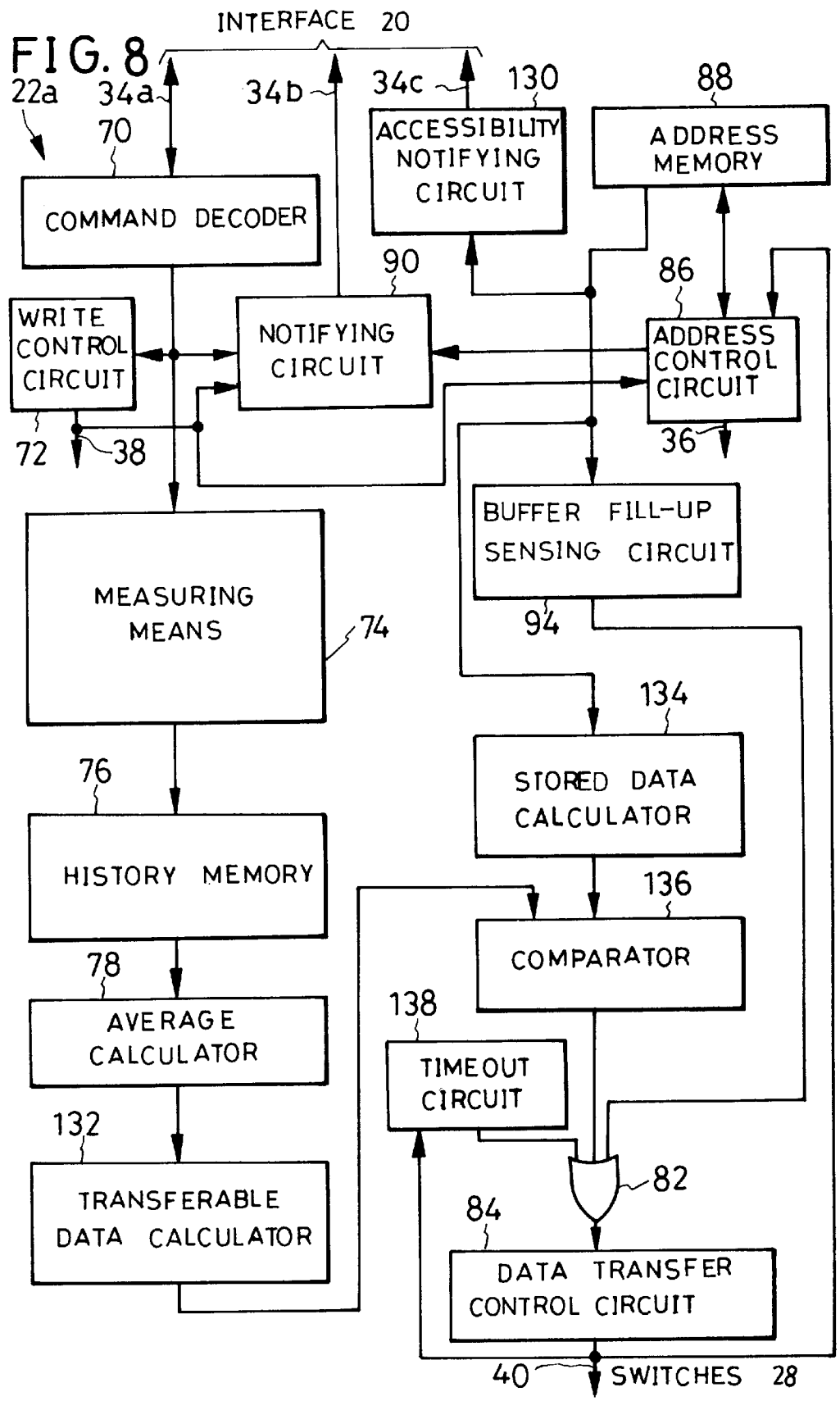
FIG. 8 is a diagram similar to FIG. 2 but showing a modified microprocessor controller for use in the FIG. 1 device.

FIG. 8 shows another modified microprocessor controller 22a for use in the FIG. 1 data storage device 10 in lieu of the controller 22. A comparison of this figure with FIG. 2 will reveal that this controller 22a and the first disclosed controller 22 share many components. Like reference numerals are therefore used to denote such like components, and the following description of the controller 22a will be limited to its features not found in the FIG. 2 controller 22.

The controller 22a features, first of all, an accessibility notifying circuit 130 connected to the address memory 88. Relying on the addresses of the first and the last storage locations of the buffer 18 where data is stored, the accessibility notifying circuit 130 determines whether data is storable in the buffer, and notifies the host 12 to that effect over a line 34a. A similar circuit could, however, be provided to the FIG. 2 controller 22.

A transferable data calculator 132 is connected to the average calculator 78 for computing the amount of data that can be transferred from buffer to disk in the average time interval of the latest nine consecutive data blocks. Such an amount of data is readily calculable since the data transfer rate to the disk drive 4 and the access time thereof are both knowable.

A stored data calculator 134 is connected to the address memory 88. Like the accessibility notifying circuit 130, the calculator 134 relies on the addresses of the first and the last storage locations of the buffer 18 where data is stored, for ascertaining the amount of data stored therein.

The noted transferable data calculator 132 and stored data calculator 134 are both connected to a comparator 136. Comparing the two inputs, the comparator 136 puts out a signal indicative of whether the amount of data stored in the buffer is not more than the amount that can be transferred to the disk in the latest average data block time interval. The output of the comparator 136 is connected to one of the three inputs of the OR gate 82 and thence to the data transfer control circuit 84. Data transfer from buffer to disk takes when the amount of data stored in the buffer is not more than the amount that can be transferred to the disk in the average data block time interval.

A second input of the OR gate 82 is connected to the buffer fill-up sensing circuit 94, as in the FIG. 2 controller 22. A third input of the OR gate 82, however, is connected to a timeout circuit 138 constituting a further feature of this controller 22a. Unlike the timeout circuit 80 of the FIG. 2 controller 22, the timeout circuit 138 has an input connected to the data transfer control circuit 84 for measuring the lapse of time from the end, or beginning, of the last data transfer period from buffer to disk. Upon lapse of a preset period, which may be from two to fifty times the average write access time interval, the timeout circuit 138 signals the data transfer control circuit 84 for immediate data transfer from buffer to disk. The timeout circuit 138 could be connected to the address control circuit 86 for letting it know the beginning or end of the last data transfer period.

Figure 9:
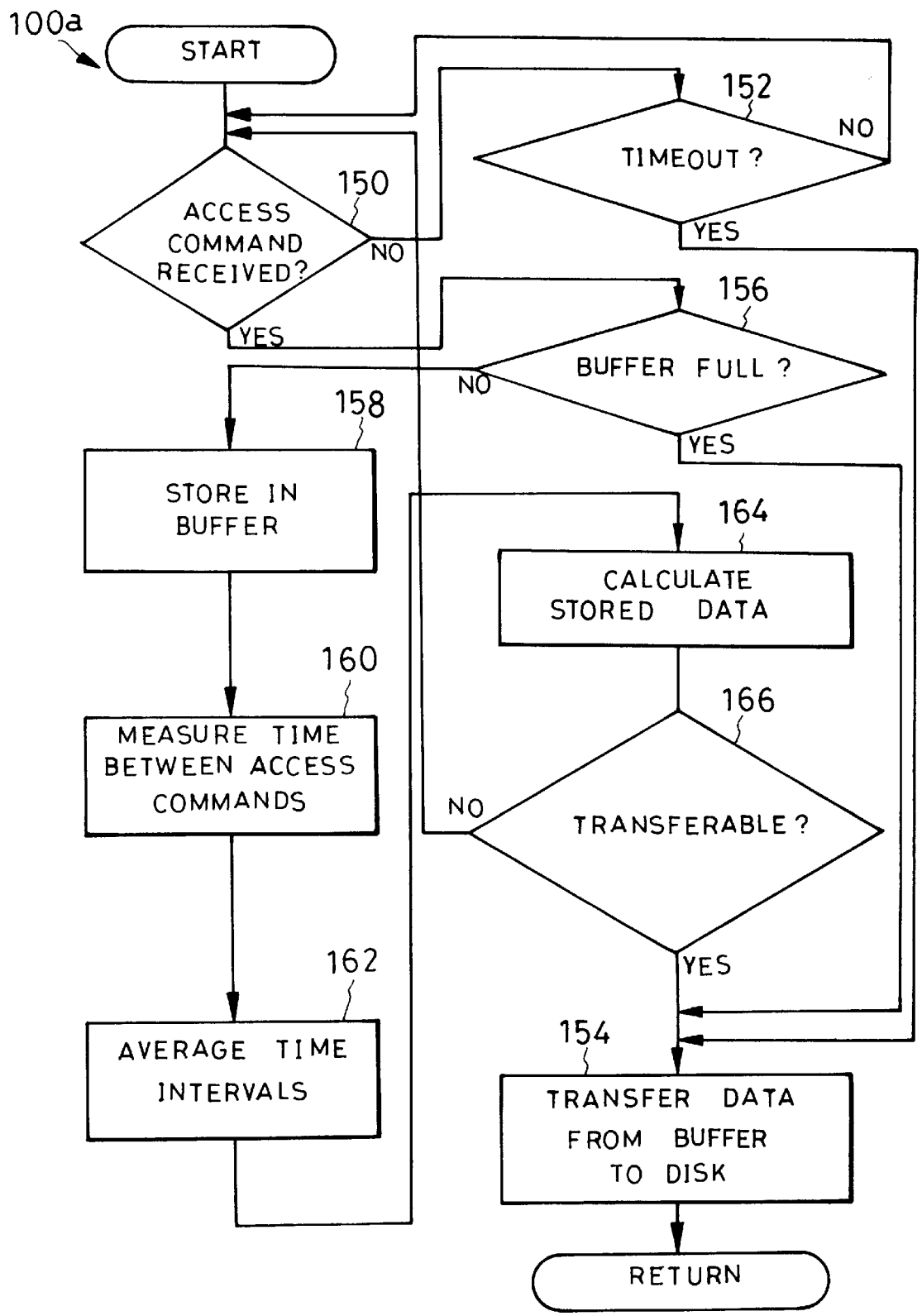
FIG. 9 is a flowchart of another data storage routine to be implemented by the FIG. 8 controller.

Flowcharted in FIG. 9 is a data storage routine 100a programmed into the FIG. 8 controller 22a. The routine waits for a write access command from the host at a logical node 150. As long as no such command is received, the time is measured from the beginning or end of the last data transfer from buffer to disk by the timeout circuit 138 of the FIG. 8 controller 22a, according to another node 152. Upon expiry of the noted preset period with no write access command received, the routine jumps to a block 154 for immediate transfer of all the stored data from buffer to disk.

When a write access command is received, it is asked at still another node 156 whether the buffer is full of data or nearly so. The answer "yes" to the node 156 leads again to the block 154 for immediate transfer of all the stored data from buffer to disk. The data accompanying the received access command is written on the buffer according to a block 158 in cases where the buffer is not yet full.

The next block 160 dictates the measurement of the time intervals $T_{-7}$–$T_2$, FIG. 10(A), between successive data blocks $D_{-8}$–$D_2$, or between write access commands accompanying such data blocks, or of the time spacings $t_{-7}$–$t_2$ between the data blocks. As has been stated, the data block time intervals $T_{-7}$–$T_2$ are considered equivalent to the data block time spacings $t_{-7}$–$t_2$ because of the extremely high rate of data transfer from host to buffer in comparison with the access time of the disk drive. The eight latest measurements thus made at this block 160 are stored in the history memory 76 of the FIG. 8 controller 22a.

Figure 10:
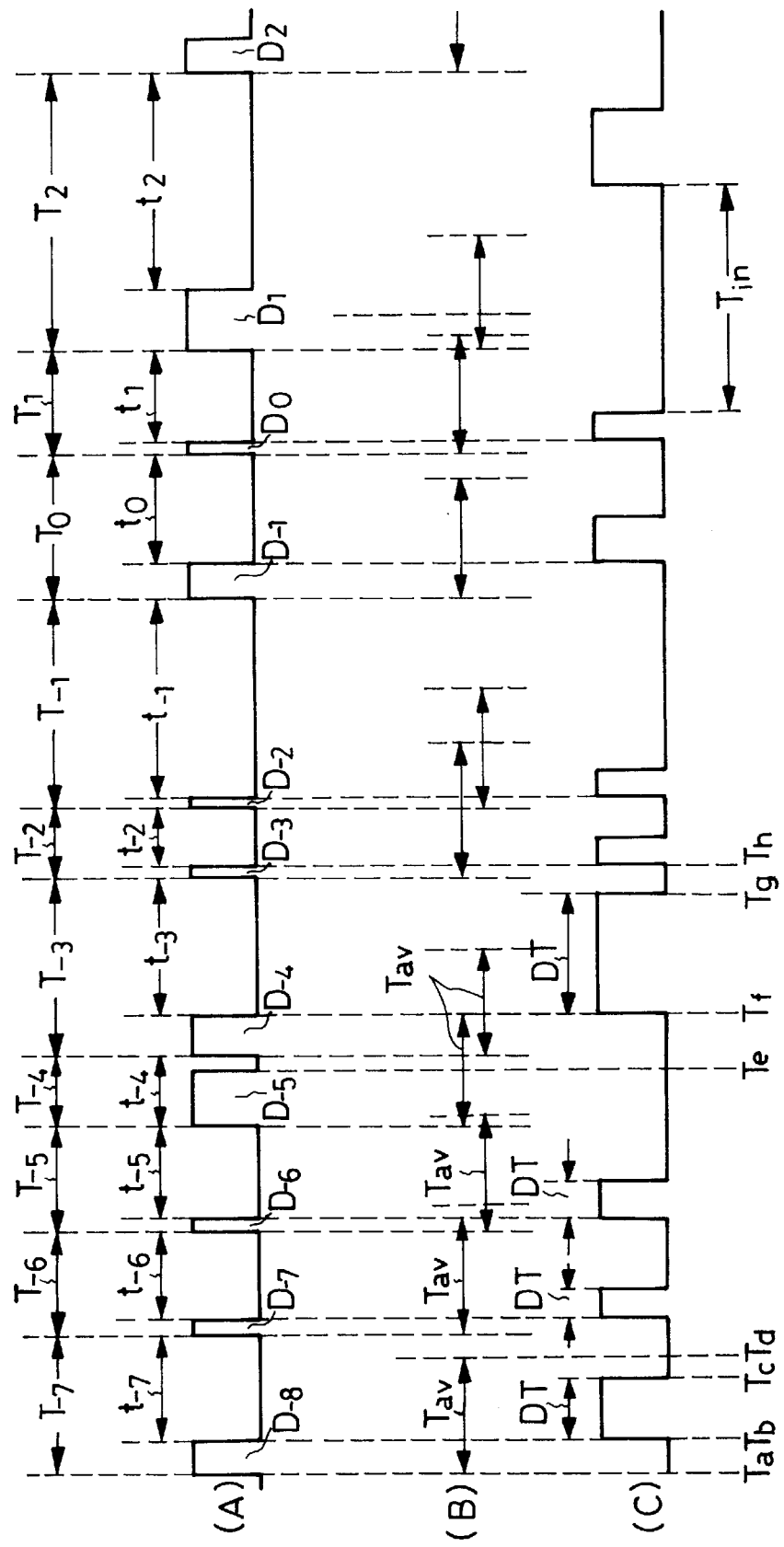
FIG. 10, consisting of (A)–(C), is a timing diagram explanatory of how data blocks are supplied from the host to the buffer, and thence to the disk, according to the FIG. 9 routine.

Then, at the next block 162, the average $T_{av}$ of the stored eight time intervals between the nine latest data blocks is computed by the average calculator 78, FIG. 8, in the same manner as described above in connection with the block 114 of the FIG. 5 data storage routine 100. FIG. 10 shows at (B) the data block time interval averages $T_{av}$ computed as successive data blocks are received from the host. The computation of each such average $T_{av}$ is tantamount to the prediction of a most likely time interval from the latest data block and the next, as will become more apparent as the description progresses. Such a time interval could be predicted, perhaps more closely, by computing the weighted average $T_{av}'$ at this block 162 according to the teachings of FIG. 7.

Then comes another block 164 at which the amount of data stored in the buffer is ascertained. This block is implemented by the stored data calculator 134, FIG. 8, which computes the stored amount of data from the contents of the address memory 88.

A logical node 166 is then encountered which asks whether the whole data stored in the buffer is transferable to the disk within the latest average $T_{av}$ of eight consecutive data block time intervals, that is, during the most likely time interval until the next data block will be received. A reference back to FIG. 8 will reveal that the answer to this question is found by the comparator 136 having its two inputs connected to the transferable data calculator 132 and to the stored data calculator 134. The answer "yes" to this node 166 directs the routine to the block 154, according to which the whole stored data is transferred from buffer to disk.

The advantages gained by the FIG. 9 data storage routine 100a, capable of implementation by the FIG. 8 microprocessor controller 22a, will be better appreciated upon inspection of FIG. 10. Assume that no data is stored in the buffer at time $T_a$, and that the data block $D_{-8}$ is written on the buffer from time $T_a$ to time $T_b$. Then, according to the node 166 of the FIG. 9 routine 100a, it is predicted whether the data block $D_{-8}$ is transferable from buffer to disk before the next data block will be received. Toward this end the average $T_{av}$ of eight latest data block time intervals, and the amount of data that can be transferred during this average time interval (or expected next time interval) $T_{av}$, are computed. The thus determined transferable data amount is then compared with the amount of data stored in the buffer, that is, with the amount of the data block $D_{-8}$; in other words, the time required for the transfer of the data block $D_{-8}$ is compared with the expected next data block time interval $T_{av}$. The data block $D_{-8}$ is transferred from buffer to disk immediately after its temporary storage in the buffer if the data block proves transferable within the expected next data block time interval $T_{av}$. It will be noted from (B) and (C) in FIG. 10 that the period DT, from time $T_b$ to time $T_c$, of data transfer from buffer to disk is shorter than the expected next data block time interval $T_{av}$, from time $T_a$ to time $T_d$.

Such immediate data transfer from buffer to disk is preferable because data is safer on the disk than on the buffer. The accessibility notifying circuit 130, FIG. 8, of the controller 22a will notify the host of the completion of the writing of the data block $D_{-8}$ on the disk at the time $T_b$, when the storage of the data on the buffer is completed, even though the writing of the data block $D_{-8}$ on the disk is actually completed at the later time $T_c$. The apparent access time of the storage device is therefore greatly shortened.

On the other hand, if data blocks had been supplied at relatively short intervals before the time $T_a$, the expected next data block time interval $T_{av}$ would be too short for immediate transfer of the data block $D_{-8}$ from buffer to disk. Then the data block would be left stored in the buffer, either until the expected time interval $T_{av}$ grows sufficiently long or until the buffer fills up or nearly does so.

Immediate data transfer from buffer to disk will not take place, either, if the received data block is too much larger than the several preceding ones. Take, for example, the data block $D_{-5}$, FIG. 10(A). This data block is so large in light of the expected next data block time interval $T_{av}$, FIG. 10(B), that it is not transferred from buffer to disk at time $T_0$, FIG. 10(C), but at time $T_f$ when the buffer fills up on being stored with the next data block $D_{-4}$. This data transfer from time $T_f$ to time $T_g$ is as a result of the answer "yes" to the node 156 of the FIG. 9 data storage routine 100a.

Possibly, the host may put out a write access command during the prolonged data transfer period $T_f$–$T_g$, but the data storage device will notify the host of inaccessibility. The overall accessibility of the device will nevertheless be virtually unimpaired because the buffer will seldom fill up in practice.

A further feature of the FIG. 9 data storage routine 100a is the node 152, according to which data is transferred from buffer to disk when such data transfer has not taken place for a preset period of time, regardless of whether the buffer is full or not. In FIG. 10 the data block $D_1$ on being stored in the buffer is not immediately transferred to the disk because its amount is too large in light of the expected next data block time interval $T_{av}$. The actual time interval $T_2$ to the next data block $D_2$ is shown to be much longer than the expected interval $T_{av}$, so that the data block $D_1$ is transferred to the disk upon lapse of the preset period $T_{in}$ from the end of the previous data transfer period DT from buffer to disk. Thus the data block $D_1$ is not left stored in the buffer for an indefinitely long period of time pending the receipt of the next data block $D_2$.

Fourth Form

Figure 11:
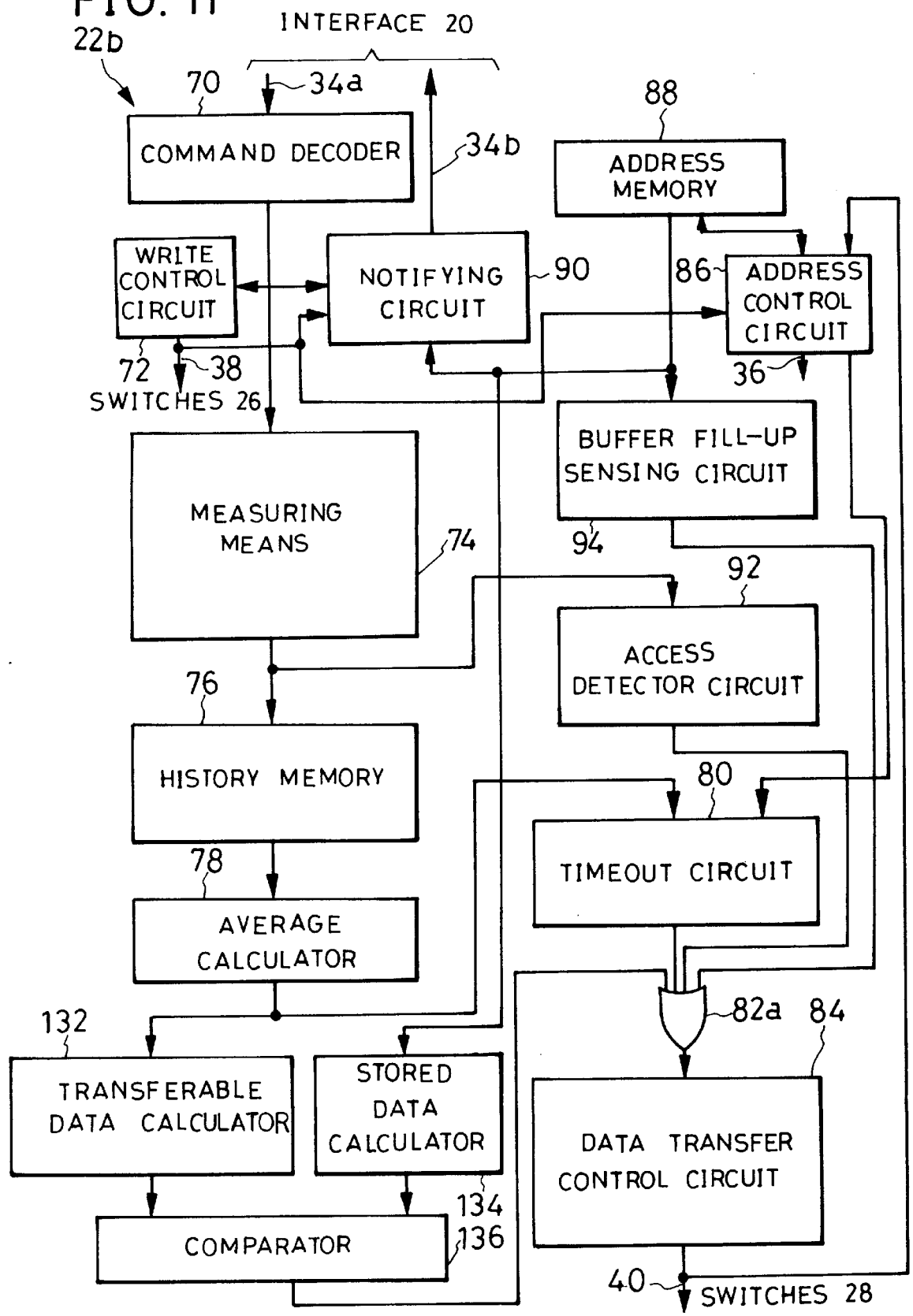
FIG. 11 is a diagram similar to FIG. 2 but showing another modified microprocessor controller for use in the FIG. 1 device.

In FIG. 11 is shown still another modified microprocessor controller 22b for use in the FIG. 1 data storage device 10 in substitution for the first disclosed controller 22. The controller 22b differs from the FIG. 2 controller 22 in additionally comprising the transferable data calculator 132, the stored data calculator 134 and the comparator 136. All being found in the FIG. 8 controller 22b, these additional components are identified by the same reference numerals as used in that figure. Another difference is that the three input OR gate 82 of the controller 22b is replaced by a four input OR gate 82a. The controller 22b is identical with the controller 22 in the other details of construction, so that like reference numerals are used to denote like parts in FIGS. 2 and 11.

Functionally, too, the additional components 132, 134 and 136 are similar to their FIG. 8 counterparts. The transferable data calculator 132 is connected to the average calculator 78 for computing the amount of data that is transferable from buffer to disk in the latest data block time interval average, or expected next data block time interval, $T_{av}$. The stored data calculator 134 is connected to the address memory 88 for ascertaining the amount of data stored in the buffer 18, FIG. 1. The comparator 136 compares the outputs from the calculators 132 and 134 and determines whether the whole data stored in the buffer is transferable to the disk in the expected next data block time interval $T_{av}$. The output of the comparator 136 is connected to one of the four inputs of the OR gate 82a, the connections of the other three inputs being the same as in FIG. 2.

Figure 12:
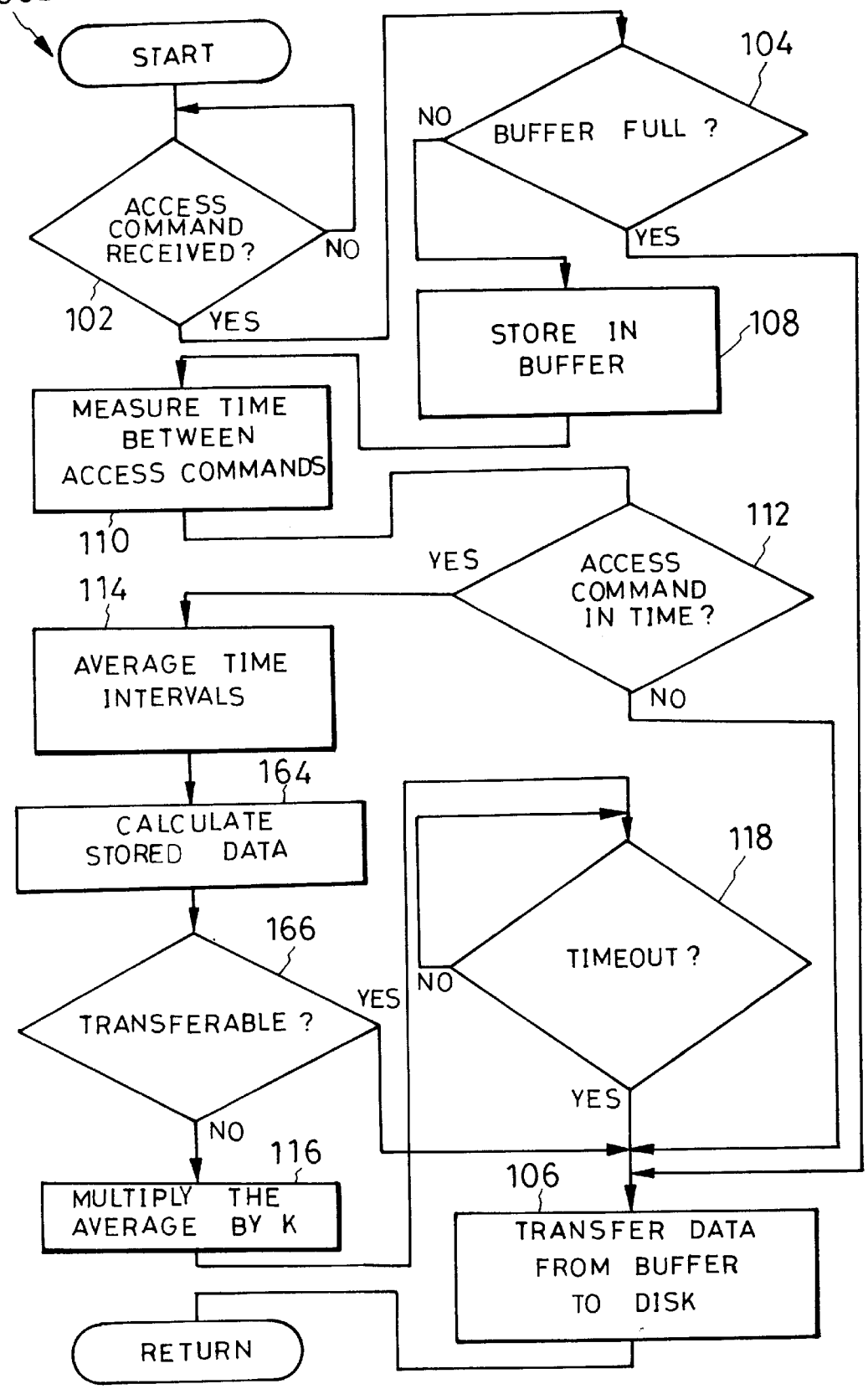
FIG. 12 is a flowchart of still another data storage routine to be implemented by the FIG. 11 controller.

Flowcharted in FIG. 12 is the data storage routine 100b to be executed by the FIG. 11 controller 22b. A comparison of this flowchart with that of FIG. 5 will indicate that this routine 100b differs from the FIG. 5 routine 100 only in having the "Calculate Stored Data" block 164 and "Transferable ?" node 166 between the blocks 114 and 116. These block 164 and node 166 are similar to those designated by the same reference numerals in the FIG. 9 data storage routine 100a.

If the answer to the node 166 is yes, that is, if all the data stored in the buffer memory is transferable to the disk in the expected next data block time interval $T_{av}$, then the data is immediately transferred according to the block 106. If the answer is no, on the other hand, then the routine goes through the block 116 to the node 118 which asks if the inhibit period $T_{in}$ has passed from the completion of previous data transfer from buffer to disk. As in the FIG. 5 routine 100, data is transferred from buffer to disk according to the next block 106 if the answer to the node 118 is yes.

Thus, in this data storage routine 100b, data is transferred from buffer to disk according to the node 166 in preference to data transfer according to the node 118. Being a combination of the FIG. 5 routine 100 and the FIG. 9 routine 100a, this FIG. 12 routine 100b possesses the advantages of both routines 100 and 100a.

Possible Modifications

Despite the foregoing detailed disclosure, it is not desired that the invention be limited by the exact details of the illustrated embodiments or the description thereof. The following, then, is a brief list of possible modifications, alterations and adaptations which are all believed to fall within the scope of the present invention:

1. In the first described embodiment of FIGS. 1–6, data could be transferred from buffer to disk upon lapse of a variable time interval, determined by the average of several latest data block time intervals, from the beginning, instead of the end as at (B) in FIG. 6, of previous data transfer. This alternative is possible because the data transfer periods $DT_1$–$DT_7$ are generally each shorter than the time spacings $T_{in}$ therebetween.
2. The average calculator 78 of the FIG. 8 controller 22a, and the average calculator 78 of the FIG. 11 controller 22b, could both be replaced by the weighted average calculator 78a of FIG. 7.
3. The access command detector 92 of the FIG. 2 controller 22, and the "Access Command in Time?" node 112 of the FIG. 5 data storage routine 100, could both be omitted.
4. The buffer fill-up sensing circuit 94 of the FIG. 2 controller 22, and the "Buffer Full?" node 104 of the FIG. 5 data storage routine 100, could both be omitted.
5. The buffer fill-up sensing circuit 94 or timeout circuit 138 of the FIG. 8 controller 22a, and the "Buffer Full?" node 156 or "Timeout?" node 152 of the FIG. 9 data storage routine 100a, could be omitted.
6. The controllers 22, 22a and 22b could each be comprised of the individual components depicted in FIGS. 2, 8 and 11, instead of in the form of a microprocessor.
7. A hard or fixed disk drive or other storage device could be employed in place of the magneto-optic disk drive 16, FIG. 1.

What is claimed is:

1. In a peripheral data storage device wherein data blocks received at variable time intervals from a host computer are stored in a temporary memory prior to transfer to a main memory, the temporary memory being shorter in access time than the main memory, a data storage method which comprises:

(a) measuring the time intervals of data blocks successively received from the host and stored in the temporary memory;

(b) computing the average of the time intervals of at least three latest consecutive data blocks;

(c) determining a desired time interval during which data transfer is to be inhibited from the temporary memory to the main memory, by multiplying the above computed average by a preselected coefficient; and (d) transferring data from the temporary memory to the main memory upon expiry of the desired time interval from the completion of previous data transfer from the temporary memory to the main memory.

2. The data storage method of claim 1 which further comprises:

(a) determining whether the time interval between any two consecutive data blocks exceeds a predetermined limit; and (b) transferring data from the temporary memory to the main memory when the time interval between any two consecutive data blocks exceeds the predetermined limit, without regard to the desired time interval.

3. The data storage method of claim 1 which further comprises:
   (a) supervising the amount of data stored in the temporary memory; and
   (b) transferring data from the temporary memory to the main memory when the amount of data stored in the temporary memory exceeds a predetermined limit, without regard to the desired time interval.

4. The data storage method of claim 1 wherein the average of the data block time intervals is a weighted average, with progressively greater weights given to more recent data block time intervals.

5. In a peripheral data storage device wherein data blocks received at variable time intervals from a host computer are stored in a temporary memory prior to transfer to a main memory, the temporary memory being shorter in access time than the main memory, a data storage method which comprises:
   (a) measuring the time intervals of data blocks successively received from the host and stored in the temporary memory;
   (b) computing the average of the time intervals of at least three latest consecutive data blocks;
   (c) ascertaining the amount of data stored in the temporary memory after each data block has been stored therein;
   (d) determining whether the whole data stored in the temporary memory is transferable therefrom to the main memory in the average time interval computed at step (b);
   (e) transferring the whole stored data from the temporary memory to the main memory if such data transfer is found possible at step (d); and
   (f) transferring data from the temporary memory to the main memory when the data stored in the temporary memory subsequently increases to a predetermined limit, if the transfer of the whole data stored in the temporary memory to the main memory is found impossible at step (d).

6. In a peripheral data storage device wherein data blocks received at variable time intervals from a host computer are stored in a temporary memory Prior to transfer to a main memory, the temporary memory being shorter in access time than the main memory, a data storage method which comprises:
   (a) measuring the time intervals of data blocks successively received from the host and stored in the temporary memory;
   (b) computing the average of the time intervals of at least three latest consecutive data blocks;
   (c) ascertaining the amount of data stored in the temporary memory after each data block has been stored therein;
   (d) determining whether the whole data stored in the temporary memory is transferable therefrom to the main memory in the average time interval computed at step (b);
   (e) transferring the whole stored data from the temporary memory to the main memory if such data transfer is found possible at step (d);
   (f) measuring the lapse of time from each data transfer from the temporary memory to the main memory; and
   (g) transferring data from the temporary memory to the main memory when the time from each data transfer from the temporary memory to the main memory exceeds a predetermined limit.

7. The data storage method of claim 6 wherein the average of the data block time intervals is a weighted average, with progressively greater weights given to more recent data block time intervals.

8. In a peripheral data storage device wherein data blocks received at variable time intervals from a host computer are stored in a temporary memory prior to transfer to a main memory, the temporary memory being shorter in access time than the main memory, a data storage method which comprises:
   (a) measuring the time intervals of data blocks successively received from the host and stored in the temporary memory;
   (b) computing the average of the time intervals of at least three latest consecutive data blocks;
   (c) ascertaining the amount of data stored in the temporary memory after each data block has been stored therein;
   (d) determining whether the whole data stored in the temporary memory is transferable therefrom to the main memory in the average time interval computed at step (b);
   (e) transferring the whole stored data from the temporary memory to the main memory if such data transfer is found possible at step (d);
   (f) determining, if such data transfer is found impossible at step (d), a desired time interval at which data is to be transferred from the temporary memory to the main memory, by multiplying the above computed average data block time interval by a preselected coefficient; and
   (g) transferring data from the temporary memory to the main memory upon lapse of the desired time interval from previous such data transfer.

9. The data storage method of claim 8 which further comprises:
   (a) determining whether the time interval between any two consecutive data blocks exceeds a predetermined limit; and
   (b) transferring data from the temporary memory to the main memory when the time interval between any two consecutive data blocks exceeds the predetermined limit, by overriding steps (b) through (g) of claim 10.

10. The data storage method of claim 8 which further comprises:
    (a) supervising the amount of data stored in the temporary memory; and
    (b) transferring data from the temporary memory to the main memory when the amount of data stored in the temporary memory exceeds a predetermined limit, by overriding steps (a) through (g) of claim 10.

11. The data storage method of claim 8 wherein the average of the data block time intervals is a weighted average, with progressively greater weights given to more recent data block time intervals.

12. A data storage device for storing data blocks supplied at variable time intervals from a host computer, comprising:
    (a) a temporary memory for temporarily storing data blocks received from the host;
    (b) a main memory for storing data transferred from the temporary memory, the main memory being longer in access time than the temporary memory;

(c) means for measuring the time intervals of data blocks successively received from the host and stored in the temporary memory;

(d) means for averaging the measured time intervals of at least three latest consecutive data blocks;

(e) means for determining a desired time interval during which data transfer is to be inhibited from the temporary memory to the main memory, by multiplying the average of the time intervals of at least three latest consecutive data blocks by a preselected coefficient; and (f) means for causing data transfer from the temporary memory to the main memory upon expiry of the desired time interval from the completion of previous data transfer from the temporary memory to the main memory.

13. The data storage device of claim 12 further comprising means for causing data transfer from the temporary memory to the main memory when the time interval between any two consecutive data blocks exceeds a predetermined limit, without regard to the desired time interval.

14. The data storage device of claim 12 further comprising means for causing data transfer from the temporary memory to the main memory when the amount of data stored in the temporary memory exceeds a predetermined limit, without regard to the desired time interval.

15. The data storage device of claim 12 wherein the averaging means computes the weighted average of the data block time intervals, with progressively greater weights given to more recent data block time intervals.

16. A data storage device for storing data blocks supplied at variable time intervals from a host computer, comprising:

(a) a temporary memory for temporarily storing data blocks received from the host;

(b) a main memory for storing data transferred from the temporary memory, the main memory being longer in access time than the temporary memory;

(c) means for measuring the time intervals of data blocks successively received from the host and stored in the temporary memory;

(d) means for averaging the measured time intervals of at least three latest consecutive data blocks;

(e) means for ascertaining the amount of data stored in the temporary memory after each data block has been stored therein;

(f) means for determining whether the whole data stored in the temporary memory is transferable therefrom to the main memory in the average time interval of at least three latest consecutive data blocks;

(g) means for causing the transfer of the whole stored data from the temporary memory to the main memory if the determining means determined that such data transfer is possible in the average time interval of at least three latest consecutive data blocks; and (h) means for causing data transfer from the temporary memory to the main memory when the amount of data stored in the temporary memory exceeds a predetermined limit.

17. A data storage device for storing data blocks supplied at variable time intervals f rom a host computer, comprising:

(a) a temporary memory for temporarily storing data blocks received from the host;

(b) a main memory for storing data transferred from the temporary memory, the main memory being longer in access time than the temporary memory;

(c) means for measuring the time intervals of data blocks successively received from the host and stored in the temporary memory;

(d) means for averaging the measured time intervals of at least three latest consecutive data blocks;

(e) means for ascertaining the amount of data stored in the temporary memory after each data block has been stored therein;

(f) means for determining whether the whole data stored in the temporary memory is transferable therefrom to the main memory in the average time interval of at least three latest consecutive data blocks;

(g) means for causing the transfer of the whole stored data from the temporary memory to the main memory if the determining means determines that such data transfer is possible in the average time interval of at least three latest consecutive data blocks; and (h) means for causing data transfer from the temporary memory to the main memory upon expiry of a preset period of time from each data transfer from the temporary memory to the main memory.

18. The data storage device of claim 16 wherein the averaging means computes the weighted average of the data block time intervals, with progressively greater weights given to more recent data block time intervals.

19. A data storage device for storing data blocks supplied at variable time intervals from a host computer, comprising:

(a) a temporary memory for temporarily storing data blocks received from the host;

(b) a main memory for storing data transferred from the temporary memory, the main memory being longer in access time than the temporary memory;

(c) means for measuring the time intervals of data blocks successively received from the host and stored in the temporary memory;

(d) means for averaging the measured time intervals of at least three latest data blocks;

(e) means for ascertaining the amount of data stored in the temporary memory after each data block has been stored therein;

(f) means for determining whether the whole data stored in the temporary memory is transferable therefrom to the main memory in the average time interval of at least three latest consecutive data blocks;

(g) means for causing the transfer of the whole stored data from the temporary memory to the main memory if the determining means determines that such data transfer is possible in the average time interval of at least three latest consecutive data blocks;

(h) means for setting, if the determining means determines that the transfer of the whole data from the temporary memory to the main memory in the average time interval of at least three latest consecutive data blocks is impossible, a desired time interval at which data is to be transferred from the temporary memory to the main memory, by multiplying the average time interval of at least three latest consecutive data blocks by a preselected coefficient; and (i) means for causing data transfer from the temporary memory to the main memory at the desired time intervals.

20. The data storage device of claim 19 further comprising means for causing data transfer from the temporary memory to the main memory when the time interval between any two consecutive data blocks exceeds a predetermined limit, without regard to the desired time interval.

21. The data storage device of claim 19 further comprising means for causing data transfer from the temporary memory to the main memory when the amount of data stored in the temporary memory exceeds a predetermined limit, without regard to the desired time interval.

22. The data storage device of claim 19 wherein the averaging means computes the weighted average of the data block time intervals, with progressively greater weights given to more recent data block time intervals.

* * * * *